Patented July 8, 1941

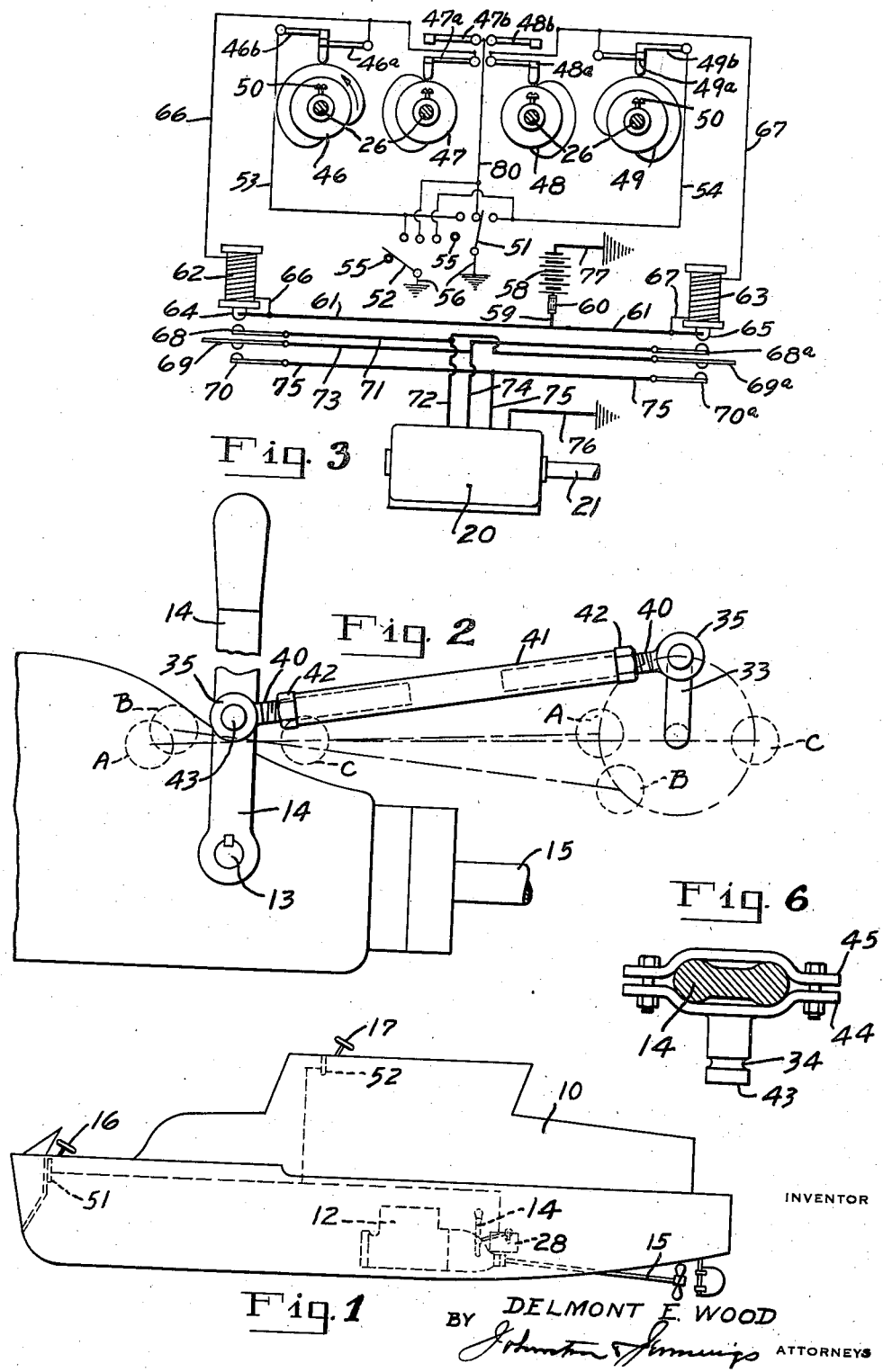

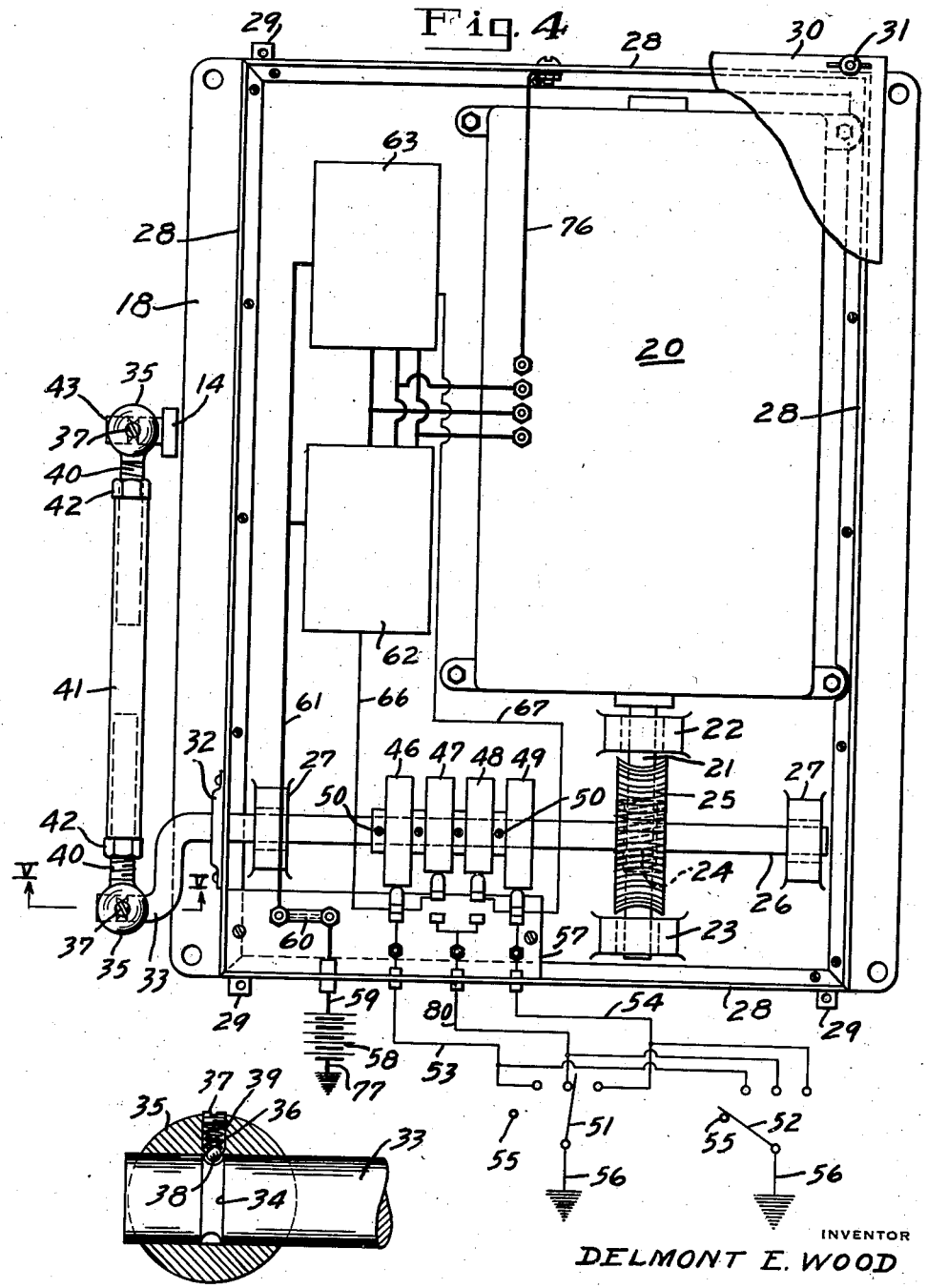

2,248,564

UNITED STATES PATENT OFFICE 2,248,564

MARINE ELECTRIC GEAR SHIFT

Delmont E. Wood, Birmingham, Ala.

Application January 3, 1939, Serial No. 249,176

6 Claims. (Cl. 192—142)

This invention relates to remote control gear shift mechanisms, and more particularly, though not exclusively, to an electric motor driven control for shifting the gears of a marine engine.

The objects of my invention may be thus briefly summarized, viz., to provide a remote control for a marine gear shift which will be automatically responsive to the closing of one switch, or a plurality of switches, selectively located in any desired part of the boat or ship; to provide a power operated gear shift mechanism which will positively engage the gears and then release the throw-in pressure to such an extent that, though the gears are held firmly in mesh, the holding pressure is not enough to cause excessive wear on the transmission parts; to provide an electrical gear shift mechanism in which the number and speed of the moving parts is reduced to a minimum, and in which electromagnetic relay means, cooperating with cams on a driven shaft, cause the mechanism to move accurately to a predetermined selective gear-engaging position; to provide an electrically controlled and operated gear shift mechanism in which the arrangement and construction of the parts requires a minimum amount of expensive, heavy duty electric cable, and in which the remote, light duty, control circuits carry only sufficient current to energize the relays that control the main power circuits; to provide an electrically driven gear shift which can be driven by a small motor but which will, due to the means employed to transmit its motion to the gear shift lever, produce a great amount of power at the point in the throw, when most power is needed to effect a shifting of the gears; to provide a gear shift which is capable of being connected to the transmission without removing the manually operable shift lever, so that in case of failure of the power supply, the gears may still be shifted, as usual, by hand; to provide a gear shift which is readily adjustable to, and therefore adapted for use with, various transmissions that require a different angular throw of the shift lever to effect a change of the gears; and to provide a gear shift mechanism having all of the above mentioned features which will be capable of adaptation to practically any type of boat or ship without having to make material changes in the installation of the engine or transmission.

Other objects and advantages will more fully appear by reference to the illustrated embodiment of my invention shown in the accompanying drawings, in which—

Fig. 1 is a side elevational view of a boat equipped with my improved remote control gear shift mechanism;

Fig. 2 is an enlarged view, fragmental, showing the gear shift lever and its motor drive mechanism in various operating positions;

Fig. 3 is a wiring diagram showing the hand controlled switches, the relays and the cam operated switches for the motor control circuits;

Fig. 4 is a plan view of the gear shift mechanism with the top of its cabinet broken away;

Fig. 5 is a detail sectional view taken on the line V—V of Fig. 4; and

Fig. 6 is a sectional view through the gear shift lever showing a modified adjustable type of clamp carrying the connecting pin shown in Fig. 5.

Similar reference numerals refer to similar parts throughout the drawings.

In the embodiment of my invention illustrated, I have shown a conventional type of small motor-driven, pleasure boat 10 having an engine 12 with a gear shift rod 13 controlled by the usual gear shift lever 14. The gear shift rod controls any suitable transmission mechanism, not shown, by which a forward or reverse motion or neutral position can be established for the driving connection between the motor and the propeller shaft 15. The boat is equipped with dual steering wheels 16 and 17, arranged as may be desired in different parts of the boat. All the parts above described can be widely varied in their detail structure, as they form no particular part of my present invention.

In juxtaposition to the transmission mechanism I securely mount in the boat a base 18, upon which my improved gear shift mechanism is mounted. This mechanism comprises a series wound, reversible electric motor 20, which can be of relatively small capacity, approximating that employed as a starter motor on automobiles. This motor is suitably bolted to the base 18 and its drive shaft 21 is journalled in bearings 22 and 23 also mounted on, or cast integral with, the base. I mount on the shaft 21 between said bearings a worm 24 which meshes with a worm gear 25 fast on a cross shaft 26, journalled at its ends in the bearings 27, also attached to, or formed integral with, the base 18. The several bearings 22, 23 and 27 are of the thrust-bearing type in order to take up the end thrust from the worm gear transmission. The shaft 26 projects at one end through the metallic cabinet wall 28, which is flanged at its base and preferably made fast with a water-tight joint to the base 18 and provided along its top with spot welded nuts 29, for the attachment thereto of a suitable cover 30, which may also be designed and adapted to afford a water-proof closure for the top of the cabinet. Bolts carrying wing nuts 31 serve, by engagement with nuts 29, to secure the cover in position on the cabinet.

It will be noted that one end of shaft 26 projects without this cabinet and passes through a suitable packing gland 32 which will seal against the ingress of water at that point. On the end of this shaft is provided, integrally or otherwise, a crank 33 having a groove 34 surrounding its cylindrical end and a demountable connection 35 is adapted to be slipped endwise on and off of this crank, the connection carrying a radial bore 36 closed with a plug 37 between which and a ball 38 is interposed a spring 39. The ball 38 engages a slightly contracted seat at the inner end of the bore so that it will not escape, though approximately half of the ball will project into the bore of the connection 35 and by engagement in groove 34 will form a spring latch holding the member 35 normally engaged with, and yet readily detachable from the crank 33. The connection 35 carries a threaded shank 40 which is screwed into a turn buckle sleeve 41 and held in adjusted position by a jam nut 42. A connection 35, similar to that already described except that its shank 40 is reversely threaded, is screwed into the other end of the turn buckle sleeve 41 and held set in adjustment by its jam nut 42. The latter attachment 35 is demountably engaged with a grooved pin 43 which, as shown in Fig. 2, is screwed into the gear shift lever 14 at the desired point of attachment. If desired, however, this pin 43 may, as shown in Fig. 6, be adjustable on the gear shift lever by mounting it on one member 44 of a clamp which, when bolted to the cooperative clamp member 45, will engage the handle and hold the pin at any desired position of adjustment lengthwise of the handle, according to the leverage required and the length of throw necessary for the change of gears.

I mount on the shaft 26 within the cabinet four cams all substantially alike and numbered 46, 47, 48 and 49, and these cams have collars carrying set screws 50 by means of which they may be set in the desired relative adjustment upon shaft 26. Each cam controls its respective spring contact member 46a, 47a, 48a, and 49a, (Fig. 3) and act to force said contacts outwardly into engagement with the stationary contacts 46b, 47b, 48b, and 49b respectively. The contact members 47b and 48b are cross connected to the lead 80, which in turn branches and is connected to the middle contact with which each of the two hand switches 51 and 52 respectively coacts. The contact 46b is connected by the lead 53 and its branches to corresponding contacts controlled by switches 51 and 52. The contact 49b is connected by the lead 54 and its branches to corresponding contacts for the switches 51 and 52. Each of these switches is provided with a stop indicator 55 for the non-operative position of the switch, each switch having a ground lead 56.

These several leads are brought out through the walls of the cabinet through suitable insulators preferably water-tight, and the several contacts are all mounted upon a connector block 57 suitably mounted in the cabinet. Current from any suitable source, such as the battery 58, enters by a lead 59 through the cabinet to a fuse 60, and thence by lead 61 branching to the relays 62 and 63.

Referring now to Fig. 3, it will be seen that the main power circuit 61 leads to a contact point 64 for the relay 62, and 65 for the relay 63, a branch circuit 66 being taken off lead 61 adjacent to relay 62 to supply current for that relay and this circuit being extended and connected in multiple to the movable contact members 46a and 47a. In like manner a similar circuit 67 is derived from circuit 61 for the relay 63 and is connected in multiple to the movable contacts 48a and 49a.

Associated with the relay 62 is a movable contact 68 and a stationary contact 69 and a second movable contact 70, it being contemplated, when this relay solenoid is energized, that 68 will contact 64 and 70 will contact 69. In like manner, the relay 63 controls similar contact members 68a, 69a, and 70a, which will be caused to make similar contact when 63 is energized. A heavy power line 71 connects 68 and 69a by a lead 72 into one end of the field in the motor 20. A heavy power line 73 connects the contacts 69 and 68a with a lead 74 connected to the other end of the field of said motor 20. The contacts 70 and 70a are connected in multiple by the heavy power cable 75 to the armature of the motor, which in turn is grounded by the wire 76 to complete the circuit to the battery through its ground wire 77.

In operation, when the transmission and gear shift lever are in neutral position shown in Fig. 2, the cams will stand in the positions indicated in Figs. 3 and 4. Upon moving either switch 51 or 52 from its inoperative position 55 on to the contact for lead 53, relay 62 will be energized through 53, 46a, 66, 61, 59, battery 58, to the ground, closing contacts 68 to 64 and 70 to 69. Thereupon, current will flow from battery over 61, 64, 68, 71 and 72 through the field of the motor, returning through 74, 73, 69, 70 and 75 to the motor armature and thence by 76 to the ground, and by lead 77 to the battery. This will drive the motor in a direction which will turn its crank 33 counter-clockwise, as viewed in Fig. 2, and in doing so it will rock the crank connections into dead center position in which the lever 14 is shifted to its extreme gear engaging position indicated by the dotted circle A for the forward drive, after which the crank arm continues to turn to a position beyond dead center far enough to retract the gear shift arm 14 sufficiently to ease any undue pressure on the transmission this retracted position being indicated by the dotted circle B. When the crank reaches this position, the cam 46, moving in the direction of the arrow in Fig. 3, will have run out from under contact 46a and opened circuit 66, deenergizing relay 62 and opening the motor circuit. At the same time cam 48 will have assumed position to close its contacts 48a and 48b, so that upon moving the switch 51 or 52, whichever is controlling the boat, on to the middle or neutral contact, current will flow from battery through 61, 67, 48a, 48b, and 80 back to the ground, energizing relay 63 and closing contacts 65—68a and 69a—70a, whereupon the motor circuits are established as follows: from 64 through 74 in reverse direction through the fields and out through 72, 69a, 70a and 75 to the armature and by lead 76 to the ground, whereupon the motor will turn in the reverse direction to restore the crank arm 33 to the neutral position shown in Fig. 2, at which time cam 48 will have run out from under its contact and opened the circuit of relay 63, killing the motor circuit, and the contacts controlled by cam 47 will be open. When the control switch is thrown to the right hand contact, the relay 63 will be energized in the manner already described, and current will pass in the same direction as last described through the motor, causing crank arm 33 to be turned clockwise and shift the gear shift lever to the position indicated by the dotted circle C at the right, Fig. 2, at which time contact 49a will have run off cam 49 and the circuit to relay 63 will be broken.

As cam 49 moves cam 47 will close its circuits, in just the same way as cam 48 closed its circuits when cam 46 moved, and thus the circuit is set so that on the return of the control switch from either running contact to the neutral contact, the motor will travel reversely to its last direction of travel and restore the crank to the neutral position shown in Fig. 2, and then will break the circuit as cam 47 or 48 runs out from under its respective contact and opens its relay control circuits.

It is important to note that the crank 33 approaches and assumes dead center position on either side as it moves the gear shift lever to its full forward or reverse gear engaging position, and inasmuch as considerable power is required often to accomplish the requisite positive engagement of the gears, it will be apparent that even a small motor may accomplish this by reason of the great multiplication of its power obtained on either side at the point of disappearance of the angle between the crank and the connecting rod, and, therefore, with a small motor I can supply all needed power to shift even gears which are very hard to manipulate. It will be further noted that the counter-clockwise movement of the crank to the lower dotted circular position at the left, Fig. 2, for forward driving will have eased the gear shift lever back from its extreme gear engaging position A to B, this being important to relieve the heavy thrust, required to engage the gears, during their normal driving relationship. Thus I do mechanically what now is done by hand when the operator eases the gear shift lever back out after throwing it into forward driving position. This same action could be obtained for the reverse drive if it be desired, but since the gears are not held long in mesh driving in reverse, it is not so important for this particular purpose. If, by carelessness, both switches 51 and 52 are left on different contacts, a manipulation of either may cause the battery to be short circuited, blowing the fuse 60. If this occurs the connecting arm of the crank drive can be readily disengaged from the motor crank by pulling connections 35 from the gear shift lever and crank, so that the lever is freed and the gears can be shifted by hand, as usual.

The adjustments provided by turning the turn buckle sleeve 41, by changing the screw setting of either connection 40 to the sleeve 41, and by shifting the clamp 44 up or down on the gear shift lever, are such as jointly to provide for any requisite angular throw for the gear shift lever and afford much flexibility and refinement in the several adjustments provided for this purpose.

Another means for control of the throw of the gear shift lever is the adjustment of the cams which can be so positioned with respect to each other on shaft 26 as to control the angle of throw of the gear shift lever. It will be noted from Fig. 3 that the extent of the cam to the left of the contact point 46a makes provision for this adjustment, and by turning the cam 46 angularly to the right an increased extent of cam surface will be disposed in position to control the contact 46a and thus will hold it closed longer, and, therefore, obtain a greater pull out or retraction of the gear shift lever from its extreme position to the left, Fig. 2.

The whole mechanism is compact, waterproof, comparatively inexpensive, and readily accessible for inspection and repair. But light wiring is required to be run over the boat, and the power cables are short leads with only those exposed that lead to the battery and to the ground, which greatly simplifies wiring cost and danger to the boat.

What I claim is:

1. In a motor driven attachment for operating the gear shift lever of a marine transmission, a reversible electric motor, a crank driven by said motor, means connecting the crank to said shift lever, a manually operable electric switch, electric circuits controlled by said switch for forward, reverse and neutral positions of said transmissions, relays for said electric circuits controlled by said switch, power circuits for said motor controlled by the relays for selectively throwing the shift lever into any of the said positions, and make and break switches in circuit with said manually operable switch controlled by the position of the motor driven crank and adapted to stop the motor automatically when the shift lever reaches its selected forward, reverse or neutral position.

2. In a remote control for a marine transmission, a lever for shifting the transmission gears, an electric motor driven mechanism for shifting said lever comprising a cabinet containing a high speed reversible motor, a worm reduction gearing driven by said motor, a crank driven by said gearing, a driving connection from the crank to said lever disposed to assume dead center positions as the lever approaches positions for engaging the gears for forward and reverse driving, electrical circuit connections controlled by the crank and adapted automatically to limit the angular travel of said crank, and remote manual switch means to control selectively the direction of movement of the motor to shift the gears.

3. A gear shift mechanism according to claim 2, in which the automatic switch control of circuits operated by the crank is adapted to move said driving connection beyond dead center position when shifting the gears to position for forward driving, thereby to relieve undue pressure on the transmission after the gears have been fully engaged.

4. In an actuating mechanism for the gear shift lever of a marine transmission according to claim 2 the provision of means to vary the length and point of attachment of the driving connection between the crank and gear shift lever to adapt the actuating mechanism for use as an attachment to different transmissions.

5. In a mechanism for shifting the gear shift lever of a marine transmission into its forward, reverse and neutral positions selectively, a shifter element, a reversible electric motor for actuating said element, a crank shaft connected to the shifter element, a worm gear speed reduction drive operatively connecting the motor to the crank shaft, control means for the motor comprising a manually operable switch for selecting said forward, reverse and neutral positions of said shift lever, low amperage circuits controlled by said manually operable switch, limit switches in said circuits operable by said crank shaft, relays in said circuits, and power circuits for the motor controlled by the relays, said relays being controlled jointly by the manually operable switch and the limit switches and adapted automatically to stop the motor by interrupting the power circuits when the shift lever reaches the selected position indicated by said manually operable switch.

6. In a mechanism for shifting the gear shift lever of a marine transmission into its forward, reverse and neutral positions selectively, a shifter element, a reversible electric motor for actuating said element, a crank shaft connected to the shifter element, a worm gear speed reduction drive operatively connecting the motor to the crank shaft, control means for the motor comprising a manually operable switch for selecting said forward, reverse and neutral positions of said shift lever, low amperage circuits controlled by said manually operable switch, limit switches in said circuits operable by said crank shaft, relays in said circuits, and adjustable means interposed between the crank shaft and the shift lever to vary the extent of motion imparted to said lever by the motor.

DELMONT E. WOOD.